US007012607B1

(12) United States Patent
Kurlander et al.

(10) Patent No.: US 7,012,607 B1
(45) Date of Patent: *Mar. 14, 2006

(54) METHOD AND SYSTEM FOR GENERATING USER-INTERFACE OUTPUT SEQUENCES

(75) Inventors: David J. Kurlander, Bellevue, WA (US); Daniel T. Ling, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,560

(22) Filed: Nov. 10, 1999

Related U.S. Application Data

(63) Continuation of application No. 08/583,589, filed on Jan. 5, 1996, now abandoned.

(51) Int. Cl.
*G06T 13/00* (2006.01)
*G06T 15/70* (2006.01)
*G06T 13/14* (2006.01)

(52) U.S. Cl. ............... 345/474; 345/520; 345/949; 345/952; 345/960

(58) Field of Classification Search ............ 352/87; 703/17; 345/474, 475, 473, 977, 756, 730, 345/960, 949, 952, 955, 214, 704, 706, 716, 345/723, 726, 762; 715/500.1; 719/320
See application file for complete search history.

(56) References Cited

U.S. PATENT DOCUMENTS

| | | | | |
|---|---|---|---|---|
| 5,179,700 A | * | 1/1993 | Aihara et al. | ........ 345/866 |
| 5,214,758 A | * | 5/1993 | Ohba et al. | ........ 345/473 |
| 5,498,003 A | * | 3/1996 | Gechter | ........ 463/31 |
| 5,594,856 A | * | 1/1997 | Girard | ........ 345/473 |
| 5,724,499 A | * | 3/1998 | Nishiyama et al. | ........ 345/473 |
| 5,778,059 A | * | 7/1998 | Loghmani et al. | ........ 379/243 |
| 5,801,687 A | * | 9/1998 | Peterson et al. | |
| 5,867,175 A | * | 2/1999 | Katzenberger et al. | ........ 345/473 |

OTHER PUBLICATIONS

Bertrand, Michael and Welch, William. Programming Windows Using State Tables. Dr. Dobb's Journal, Dec. 1991: 39-40.*
Sukaviriya et al. Coupling A UI Framework with Automatic Generation of Context-Sensitive Animated Help. 1990, ACM.*

* cited by examiner

*Primary Examiner*—Raymond J. Bayerl
*Assistant Examiner*—Namitha Pillai
(74) *Attorney, Agent, or Firm*—Amin & Turocy, LLP

(57) ABSTRACT

A system and/or method that generates user interface output sequences controlled by a user interface output system. The user interface output system can provide event definitions to an application pro that specify high-level actions to be performed by the sequence and can issue low-level commands to direct the actions of the user interface output sequence. The user interface output system provides a user interface output controller, which acts as an interface between an application program and the low-level commands which specify tasks for the user interface output sequence to perform. The user interface output controller is generated from a specification, using a planning methodology.

21 Claims, 8 Drawing Sheets

METHOD AND SYSTEM FOR GENERATING USER-INTERFACE OUTPUT SEQUENCES

The present application is a continuation of U.S. patent application Ser. No. 08/583,589, filed Jan. 5, 1996, and entitled METHOD AND SYSTEM FOR GENERATING USER-INTERFACE OUTPUT SEQUENCES, now abandoned.

TECHNICAL FIELD

The present invention relates generally to data processing systems, and, more particularly, to generating user interface output.

BACKGROUND OF THE INVENTION

An application program may want to generate user interface output for communicating with a user. The user interface output may include animation, audio, and textual elements. In addition, typically, the user interface output includes a combination of these elements. One example of user interface output is animation. In particular, animation is simulation of movement produced by displaying a series of successive frames on a display screen. The series of successive frames is called an animation sequence. Each frame contains all animation elements that make up a particular instance in the animation sequence. For example, an animation sequence may include a series of successive frames which result in displaying an animated bird flying. A particular frame may be one in which the bird is in the air. The frame may contain animation elements, such as a picture of the animated bird with its wines outstretched, trees in the background, and clouds in the air.

In addition, a user interface output state includes a set of conditions which defines aspects of that state. The conditions relate to animation, audio, and textual elements of the user interface output state. A user interface output state is captured by the set of values of the conditions. A user interface output sequence contains one or more user interface output states. Upon receiving an action to perform, the user interface output sequence may transition from a first user interface output state to a second user interface output state.

In particular, a first user interface output state may be captured by the set of values of a first set of conditions, and a second user interface output state may be captured by the set of values of a second set of conditions. For example, a first user interface output state may display an animated bird sleeping. The conditions for this first user interface output state may define whether the bird's eyes are open or closed, whether the bird is singing or snoring, and whether the bird is sitting on a perch or flying. The respective values for these conditions may be that the bird has its eyes closed, that the bird is snoring, and that the bird is sitting on a perch. A second user interface output state may be one in which the animated bird is singing, and the conditions for this second user interface output state may define whether the animated bird's eyes are open or closed, whether the animated bird is singing or snoring, and whether the animated bird is sitting on a perch or flying. The respective values for these conditions in the second user interface output state may be that the animated bird's eyes are open, that the animated bird is singing, and that the animated bird is sitting on a perch. Upon receiving an action indicating that the animated bird should be singing, the user interface output sequence may transition from the first user interface output state to the second user interface output state. In order to transition from the first user interface output state to the second user interface output state, the user interface output sequence may display the animated bird opening its eyes, singing instead of snoring, and sitting on a perch.

Typically, elements of user interface output have ordering requirements. For example, when a user interface output sequence displays an animated bird snoring, the snoring audio element should occur concurrently with the display of the animated bird asleep and with the motion of the animated bird's breathing. Additionally, when transitioning from displaying an animated bird sleeping to showing the animated bird flying, the snoring should be stopped before the animated bird starts to fly.

An application program may want to generate user interface output. In order to do so, the application program specifies a series of low-level commands. The low-level commands may be instructions of a particular computer programming language or instructions stored in a user interface output script. Each low-level command specifies a particular task for the user interface output sequence to perform. For example, one low-level command may be to have an animated bird flap its wings and another low-level command may be to have an animated bird open its eyes. In order to generate user interface output, the application program typically requires detailed knowledge about a first state of the user interface output, a second state that the user interface output should be in, and the low-level commands which should be invoked to transition from the first state to the second state.

For example, if an application program wants to display an animated bird flying, the application program first determines the current state of the user interface output. For this example, the animated bird is initially asleep, snoring, while sitting on a perch. The application program determines whether the animated bird is currently asleep. If the animated bird is asleep, the application program invokes low level commands to wake up the animated bird. For example, the low-level commands may include commands to open the bird's eyes and to stop the bird from snoring. Then the application program invokes low level commands to have the animated bird fly. In order to have the animated bird fly, the application program invokes low level commands such as making the animated bird's wings flap and making the animated bird rise off of the perch.

Because of the level of detail required to generate user interface output, developing an application program to generate user interface output is a time consuming process. Also, when an application program requires detailed knowledge to generate user interface output, if the user interface output is to be changed, complex changes to the application program are required. This is also time consuming and expensive.

SUMMARY OF THE INVENTION

In accordance with a first aspect of the present invention, a method is practiced in a data processing system including a display device and a processing means running an application program. In accordance with this method, a user interface output controller is provided for generating a user interface output sequence. In addition, an event is received from the application program at the user interface output controller where the event specifies a goal to be achieved by the user interface output controller. Then, a user interface output sequence is generated at the user interface output controller in response to receiving the event. The user interface output sequence achieves the goal in response to the event. Moreover, the user interface output sequence is executed at the user interface output controller so as to display the user interface output sequence on the display device.

In accordance with an additional aspect of the present invention, a user interface output system is provided for controlling the generation of a user interface output sequence. A specification is provided which identifies goal user interface output states. Goal user interface output states identify user interface output states for the user interface output system to establish. The specification also identifies operators which specify actions to be performed by the user interface output sequence. A compiler is provided for compiling the specification, which results in a user interface output controller. The user interface output controller includes plans, and each of the plans has a series of operators, a goal user interface output state, and a start user interface output state that identifies a current user interface output state of the user interface output sequence. The operators transform the start user interface output state into the goal user interface output state. While the application program is running on the processing means, the user interface output controller is provided with an event which is received from the application program, where the event identifies one of the goal user interface output states. Then, the start user interface output state of the user interface output sequence is determined. Next, one of the plans is retrieved based on the determined start user interface output state of the user interface output sequence and the identified one of the goal user interface output states. Then, each of the series of operators provided by the retrieved plan is performed to transform the determined start user interface output state into the identified one of the goal user interface output states so as to display the series of operators on the display device.

In accordance with another aspect of the present invention, a user interface output controller for generating a user interface output sequence is provided. The user interface output sequence includes a first user interface output state and a second user interface output state, where the first user interface output state and the second user interface output state each include a set of conditions representing values which capture that state. Operators which identify actions which transform the first user interface output state to the second user interface output state are also provided. In accordance with this method, an event is received from the application program at the user interface output controller, where the event specifies a goal to be achieved by the user interface output sequence. Next, it is determined whether any of the conditions precede the event. When there are conditions which precede the event, the conditions which precede the event are established. Then, the provided operators are performed to transform the first user interface output state into the second user interface output state, which establishes the event. Next, it is determined whether any of the conditions temporally follow the event. When there are conditions which temporally follow the event, the conditions which temporally follow the event are established.

In accordance with yet another aspect of the present invention, a data processing system includes a processing means for running an operating system and includes a display device displaying a user interface output state. The data processing system also includes an application program which has events, where each of the events specifies a goal to be achieved to change the user interface output state. The data processing system also includes for each of the events, an implementation of the event, where the implementation includes commands which direct the actions of the user interface output state. The data processing system further includes a user interface output controller for controlling the display of a user interface output sequence. The user interface output controller has means for receiving one of the events from the application program. The user interface output controller also has means for retrieving the implementation of the received one of the events where the implementation includes a series of commands for achieving the goal specified by the received one of the events. In addition, the user interface output controller has means for selecting each of the commands in the retrieved implementation, and means for executing each of the selected commands to achieve the goal specified by the received one of the events in the user interface output on the display device so as to display the user interface output sequence on the display device.

In accordance with a further aspect of the present invention, a data processing system includes a display device for displaying a user interface output sequence. The data processing system also includes a processing means for running an application program. The data processing system has means for providing a user interface output system for controlling the generation of the user interface output sequence. The data processing system also has means for providing a specification identifying goal user interface output states, which identify user interface output states for the user interface output system to establish, and operators which specify actions to be performed by the user interface output sequence. In addition, the data processing system has means for compiling the specification to generate a user interface output controller. Also, the data processing system has means for storing the user interface output controller in memory. The user interface output controller includes means for receiving an event from the application program, where the event identifies one of the goal user interface output states. In addition, the user interface output controller includes means for determining a current user interface output state in the user interface output sequence. Also, the user interface output controller has means for determining a sequence of operators which transform the determined current user interface output state into the identified one of the goal user interface output states. Moreover, the user interface output controller has means for performing the sequence of operators to transform the determined current user interface output state into the identified one of the goal user interface output states so as to display the sequence of operators on the display device.

DETAILED DESCRIPTION OF THE INVENTION

A preferred embodiment of the present invention provides a user interface output system for controlling the generation of user interface output sequences. The user interface output system provides event definitions, which specify, at a high-level, a goal to be achieved (i.e., actions to be performed) by the user interface output sequence to an application program. When the user interface output system receives an event from an application program, the user interface output system may issue low-level commands to direct the actions of the user interface output sequence. The application program can then ignore the details of invoking the low-level commands and may request an event in order to have the user interface output sequence achieve a goal. That is, the present invention simplifies the process of generating complex user interface output. In addition, the present invention enables combining various forms of user interface output, such as animation, audio, and textual elements.

Additionally, the user interface output system provides a user interface output controller, which acts as an interface between an application program and the low-level commands which specify tasks for the user interface output sequence to perform. That is, the user interface output controller receives an event from an application program, determines which low-level commands should be invoked in response to the desired event, and invokes the appropriate low-level commands. For example, if the current state is one in which the animated bird is sleeping and the event specifies that the animated bird should fly, the user interface output controller invokes the appropriate low-level commands to wake up the animated bird, have the animated bird flap its wings, and have the animated bird fly.

The user interface output system provides a precondition and postcondition based specification language. A developer of a user interface output controller may use this specification language to write a specification that defines the user interface output controller. The user interface output system compiles the specification to generate the user interface output controller. Furthermore, by compiling the specification prior to run time, the user interface output system provides real time user interface output.

Figure 1:
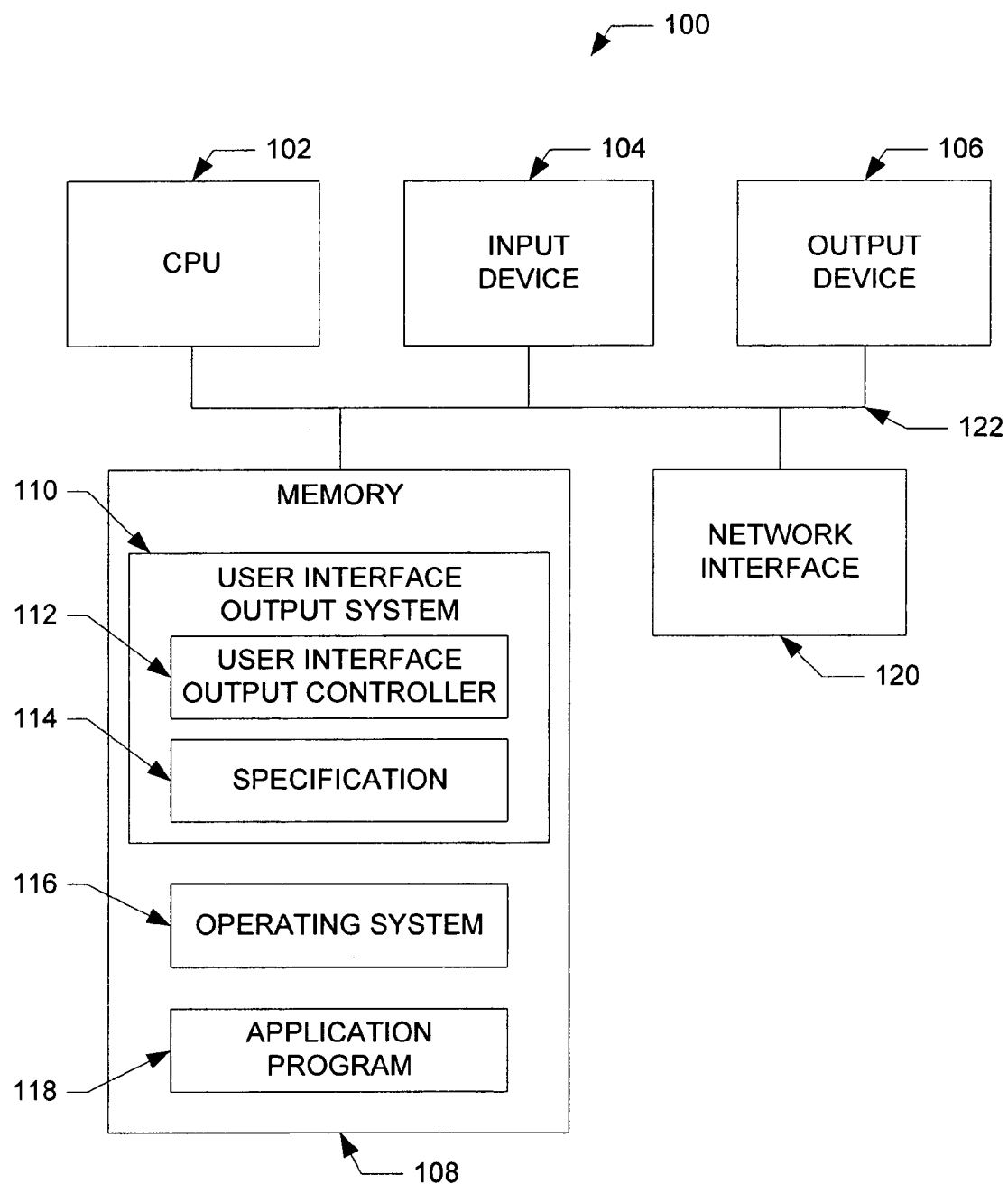
FIG. 1 is a block diagram of a data processing system which is suitable for practicing the preferred embodiment of the present invention.

FIG. 1 is a block diagram of a data processing system which is suitable for practicing the preferred embodiment of the present invention. The data processing system 100 includes a CPU 102 that is connected to an input device 104 and an output device 106. The data processing system also includes a network interface 120 for interfacing the computer system with a network. Memory 108 stores data and code. Specifically, memory 108 holds a copy of a user interface output system 110, an operating system 116, and an application program 118. The application program includes events which identify actions to be performed by the user interface output sequence. The user interface output system includes a user interface output controller 112 and a specification 114. A connecting mechanism 122, such as a bus, connects the components of the computer system.

Figure 2:
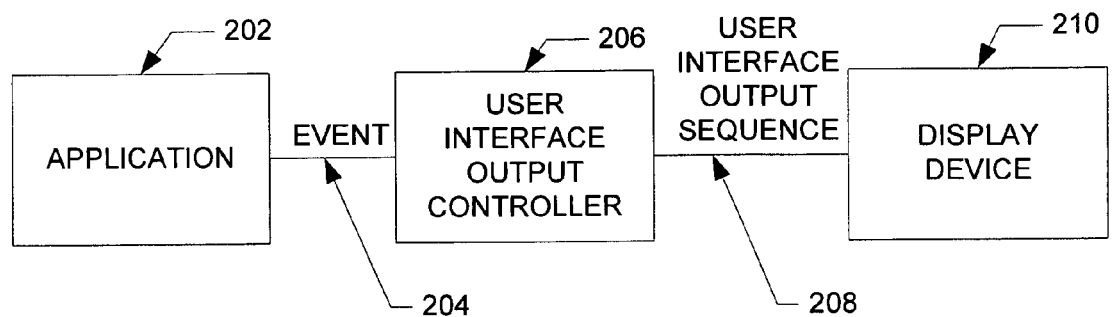
FIG. 2 illustrates the steps performed by the user interface output controller upon receiving an event from an application program in accordance with the preferred embodiment of the present invention.

The CPU 102 invokes the user interface output system 110 at the request of a user, which is received through an input device 104. The user interface output system compiles the specification 114 to produce the user interface output controller 112. Then, when the user interface output controller receives an event from an application program 118, the user interface output controller generates a user interface output sequence in response to the event, as shown in FIG. 2. In particular, an application program 202 inputs an event 204 to the user interface output controller 206. Then, the user interface output controller 206 outputs a user interface output sequence 208 to a display device 210. The user interface output controller performs the user interface output sequence, and the results are displayed on the display device.

Figure 3:
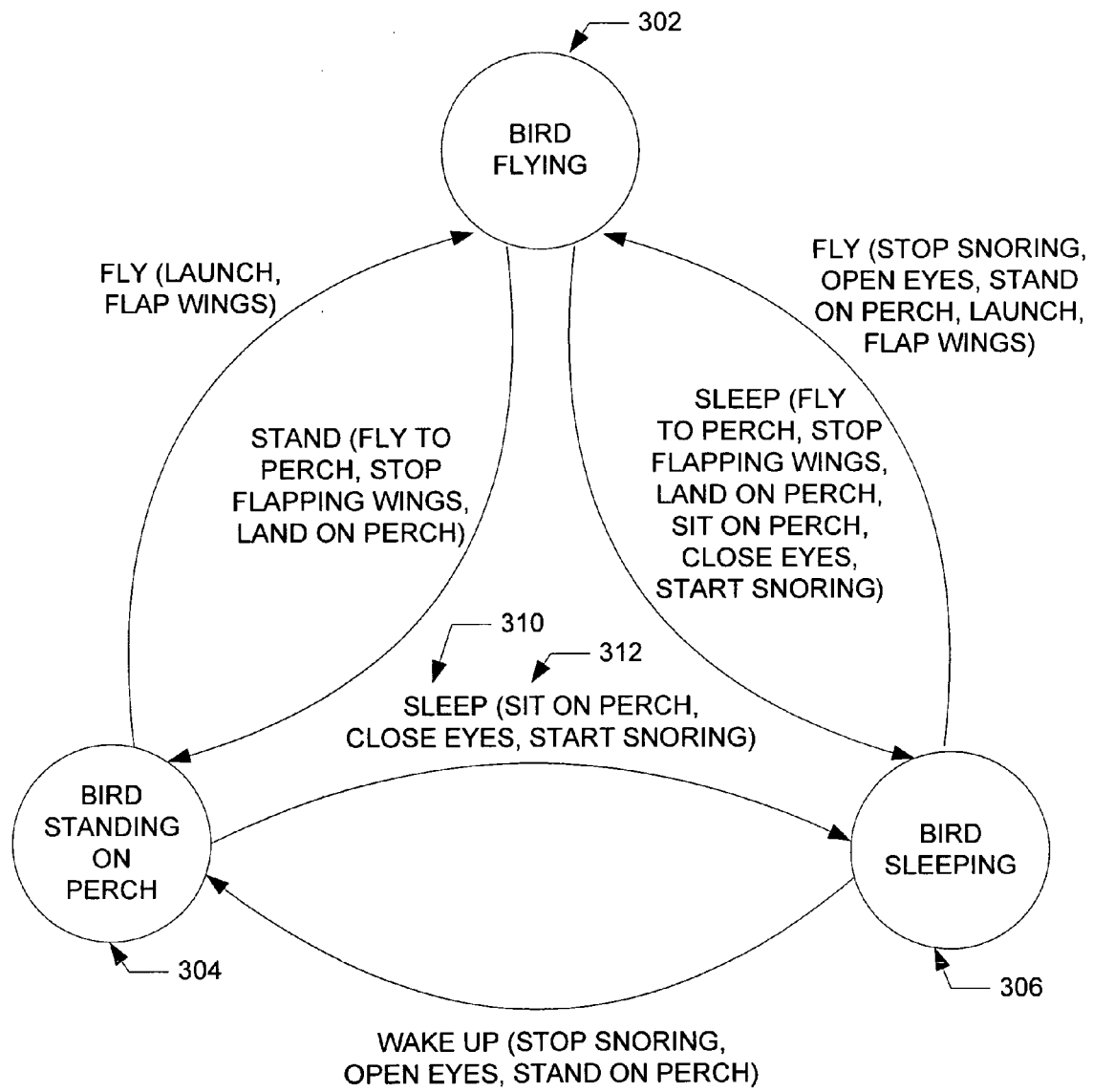
FIG. 3 illustrates a sample state machine in accordance with the preferred embodiment of the present invention.

A user interface output controller may be implemented as a state machine. However, one skilled in the art would recognize that a user interface output controller may be implemented with other means. A sample state machine is shown in FIG. 3. Although the state machine shown has only three states, one skilled in the art would recognize that a state machine for a preferred embodiment of the present invention would be much more complicated. A state machine contains user interface output states and the transitions between them. A user interface output state is captured by the values of the conditions associated with that user interface output state. The transitions between user interface output states are operators (i.e., actions) which transform a first user interface output state (i.e., a start user interface output state) to a second user interface output state (i.e., a goal user interface output state). One user interface output state is viewed as the current user interface output state, and then based on the operators which are received, the user interface output controller determines whether to transition to another user interface output state. If a transition is to be taken, the user interface output controller determines which transition to take to reach a second user interface output state.

In FIG. 3, the user interface output states are "Bird Flying" 302, "Bird Standing on Perch" 304, and "Bird Sleeping" 306. The events are "Fly," "Stand." "Sleep," and "Wake Up." The sequence of operators which are performed in order to transition from one state to another in response to a received event are shown in parenthesis besides the associated event. For example, if the current user interface output state is "Bird Standing on Perch" 304, and a "Sleep" event 310 is received, the "Sit on Perch," "Close Eyes," and "Start Snoring" operators 312 are performed. An application program can ignore the details of determining which operators to perform. Instead, an application program merely specifies an event, and the user interface output controller determines which operators to perform and performs them.

In order to generate the user interface output controller, the user interface output system provides a specification language for specifying the user interface output controller. The specification language contains event definitions which enable a developer of a user interface output controller to specify the possible events an application program may request. The events specify goal user interface output states which the user interface output sequence should reach. In addition, the specification language provides operators which specify actions. The operators transform a start user interface output state into a goal user interface output state. Typically, the start user interface output state is the current state of the user interface output sequence. The specification language also defines state variable definitions, autonomous action sequences, and state class definitions which are used by the event and operator definitions. In one preferred embodiment, all expressions in the specification language are LISP s-expressions, but one skilled in the art would recognize that alternative expressions may be used. Each of these specification language elements will now be described below.

"State variables" represent conditions of a state. State variable definitions take on the form:

(state-variable name type initial-value <values>)

The state-variable keyword indicates that this expression specifies a state variable. The name argument provides the name of this state variable. The type argument indicates the type of this state variable. State variables can be of type Boolean, integer, floating point, or string. The initial-value argument provides the initial value of a state variable. The values argument represents an optional argument which may be a list of possible values for the state variable. If a list of possible values is provided, the state variable can only take on one of these values. The brackets (e.g., < >) indicate that the argument within the brackets is an optional argument. Examples of state variable definitions are:

(state-variable 'holding-note 'Boolean false)
(state-variable 'posture 'string 'stand '(fly stand sit))

The holding-note state variable is of Boolean type and has an initial value of false. The posture state variable is a string that is initialized to stand. The posture state variable has a list of possible choices. It can take on only the three values fly, stand, or sit.

An "autonomous action sequence" is a series of actions which a user interface output controller performs automatically when a user interface output state contains the conditions defined for the autonomous action sequence. That is, autonomous action sequences are performed whenever state variables take on particular values. For example, an autonomous action sequence may be defined which displays an animated bird snoring when it is asleep. The snoring action is performed whenever the state variables of a user interface output state indicate the animated bird is asleep. An autonomous action sequence is defined by the following form:

(autoscript 'state-variable 'state-variable-value '(actions))

The autoscript keyword indicates this expression is an autonomous action sequence definition. The state-variable argument provides the state variable which determines whether to perform the autonomous action sequence. The state-variable-value argument provides the value the state-variable should take on for the autonomous action sequence to be performed. The actions argument provides a list of actions which are performed when the state-variable has the specified state-variable value.

For example, to have an animated bird snore, the state-variable alert has the value sleep and the following expression is used in the specification:

(autoscript 'alert 'sleep '(snore))

This expression results in the animated bird snoring when the animated bird is asleep. Although the example shows an autonomous action sequence bound to a single state variable, one of ordinary skill in the art would recognize that an autonomous action sequence may be bound to a combination of state variables.

"Operator definitions" specify actions which may transform a start user interface output state to a new user interface output state. Operator definitions are of the following form:

(op opname <:script scriptname>
    <:precond precondition>
    <:add postcondition>
    <:sub postcondition>
    <:must-ask boolean>)

The op keyword indicates that this is an operator definition. The opname argument indicates the name of this operator definition. The :script scriptname argument indicates the name of the script with which the operator is associated. In particular, the scriptname argument specifies the name of the file containing the user interface output script to invoke when this operation is being performed. The user interface output script contains low-level commands which specify actions for the user interface output to perform. The :precond precondition argument provides the conditions which need to be true before this operator may be performed. The :add postcondition argument specifies conditions which need to be true after the operator is performed. The :sub postcondition argument specifies conditions which should be false after the operator is performed. The :must-ask directive indicates whether the planning methodology may use this operator during the planning step. This will be discussed in more detail below in the discussion of the planning methodology. The must-ask directive is initially set to false, indicating that the planning methodology may use this operator during the planning process. When the :must-ask directive is true, this operator will only be used if explicitly requested in the :op directive of an event definition. An example operator definition appears below:

(op 'search
    :script 'stream
    :precond '(not holding-note)
    :add 'holding-note)

This defines an operator named "search," associated with a user interface output script called "stream." The precondition is not holding-note. Holding note is a state variable of Boolean type. After executing the search, the state variable holding-note will be true. The user interface output controller performs this operation by invoking the script named stream when the animated bird is not holding a note. After executing the user interface output script, the user interface output controller indicates that the state variable holding-note should be set to true.

Moreover, the :script directive may be replaced by a :director directive or a :code directive. The :director directive has an argument which indicates the name of a procedure to be performed when the operator is invoked. The :code directive specifies actual code statements to be performed when the operator is invoked. The code statements may be in a programming language such as C++.

A "macro-operator definition" is a sequence of operators that modifies a current user interface output state. The macro-operator definitions take on the following form:

(macro-op name
    :precond preconditions
    :add postconditions
    :sub postconditions
    :seq operators)

The macro-op keyword indicates this is a macro-operator definition. The name argument indicates the name of the macro-operator definition. The :precond preconditions argument specifies the conditions which should be true before the operators are performed. The :add and :sub postconditions arguments determine which conditions should be set to true or false, respectively, after the operators are performed. The :seq operators argument provides a list of operators which are performed in the sequence in which they are listed. As an example, the hard-wake macro-operator appears below:

(macro-op 'hard-wake
:precond 'alert.snore
:add 'alert.awake
:seq '(:op snort :op exhale :op focus))

The hard-wake macro-operator is performed when the alert state variable has the value snore. The "." ("dot") comparator denotes equality. So, alert.snore indicates that the alert state variable should have the value snore. After the operators indicated by the :seq argument are performed, the alert state-variable should have the value awake. The effect of invoking this macro-operator is equivalent to executing the snort, exhale, and focus operators in sequence, making the animated bird snort, exhale, then focus at the camera. The :time and :label directives, which are discussed below in the context of event definitions, can also appear in a macro-operator definition to control the relative times of the operators.

Although in the above examples, the preconditions were limited to one condition, in some cases preconditions may include several conditions. Also, some preconditions are shared by different operators. To simplify writing the preconditions, and to eliminate repeating the same complicated precondition for different operators, "state class definitions" may be used to specify preconditions. In addition, if modifications are needed to be made to the preconditions, the modification could be made in a single place. For example, a precondition for a search operator may be the following:

((not holding-note) and alert.awake and
posture.stand and (not wing-to-ear) and
(not wearing-phones))

A state class may be created which represents this precondition. Then the state class may be used as the precondition for different operators. State class definitions take the following form:

(state-class classname states)

The state-class keyword indicates this is a state-class definition. The classname argument indicates the name of the state class. The states argument is a list of state variable expressions or previously defined state classes. A state class definition for the above discussed preconditions may be the following:

(state-class stand-op ((not holding-note) and alert.awake and
posture.stand and (not wing-to-ear) and
(not wearing-phones)))

Additionally, state class definitions support multiple inheritance. That is, one state class may be defined using another state class. A state class which lists another state class inherits all state variables of this state class. If there is a conflict between state variables from the state class being defined and a prior state class, the state variables of the state class being defined take precedence. For example, a state class named stand-noteless may be defined using the state class stand-op. The state class stand-noteless may be expressed with the following state class definition:

(state-class stand-noteless
'(stand-op (not holding-note)))

In other words, the stand-noteless state class inherits all state variables from the state class stand-op, but the stand-noteless state class has the holding-note state variable set to false.

An "event definition" specifies at a high-level a goal to be achieved by the user interface output sequence and the desired timing. Event definitions take on the following form:

(event name <directives>)

The event keyword indicates that this expression defines an event. The name argument provides the name for this event. The directives argument represents a set of statements. The statements may include :state directives, :op directives, :label directives, :time directives, :add directives, :sub directives; :code directives, and :if directives.

A :state directive specifies the user interface output state the user interface output controller should achieve. The :state directive has one argument, which is a logical expression of state variables. The logical expression may include conjunctions, disjunctions, and negations.

In contrast, the :op directive has one argument which specifies an operator to perform on the current user interface output state. If the user interface output controller is not in a state in which the desired operation may be performed, the user interface output controller performs the operators to attain this state and then performs the specified operator.

For example, when an animated bird receives spoken input but cannot understand the input (i.e., cannot map the spoken input to text), an application program may send the user interface output controller an evBadSpeech event. The evBadSpeech event results in the animated bird raising its wing to its ear, and saying "Huh?" This event definition is as follows:

(event 'evBadSpeech :state 'wing-at-ear :op 'huh)

When the user interface output controller receives an evBadSpeech event, the user interface output controller determines which actions will establish the expression wing-at-ear (a single state variable) as true and performs these actions. Then, the user interface output controller establishes that the preconditions of the 'huh operator are satisfied, which may require executing other operators, and then performs the 'huh operator.

By default, the directives are achieved sequentially in time. Above, the wing-at-ear state variable is made to be true, and immediately afterwards the 'huh operator is performed. However, the label and :time directives allow alternative sequencing. The :label directive assigns a name to an instance in time represented by the position in the list of directives at which it appears. The :time directive adjusts the timing in one of these sequences. Timing directives allow operations to be scheduled in parallel or sequentially. The following provides an example of label and :time directives.

(event 'evThanks
:op 'bow
label 'a
:time '(+(label a) 3)
:op 'camgoodbye
:time '(+(label a) 5)
:op 'sit)

As defined above, when the user interface output controller receives an evThanks event, the animated bird will bow. The :label 'a statement indicates that the 'a identifier represents the time immediately after the bow. The first :time indicates that the user interface output controller should wait 3 seconds after the bow before performing the following :op directive, 'camgoodbye. The user interface output is displayed from a particular perspective, such as a perspective in which a camera is directly focused on the animated bird. The camgoodbye operator changes the user interface output state to indicate a different perspective in which the camera is not directly focused on the animated bird (i.e., the camera is in the "goodbye" position). The second :time directive indicates that the user interface output controller should wait 5 seconds after the bow before performing the following :op directive, 'sit.

The :if statement allows a block of other directives to be performed only if a logical expression is true. The :add and :sub directives change the values of state variables. The :code directive allows arbitrary C++ code to be embedded in the specification.

Figure 4:
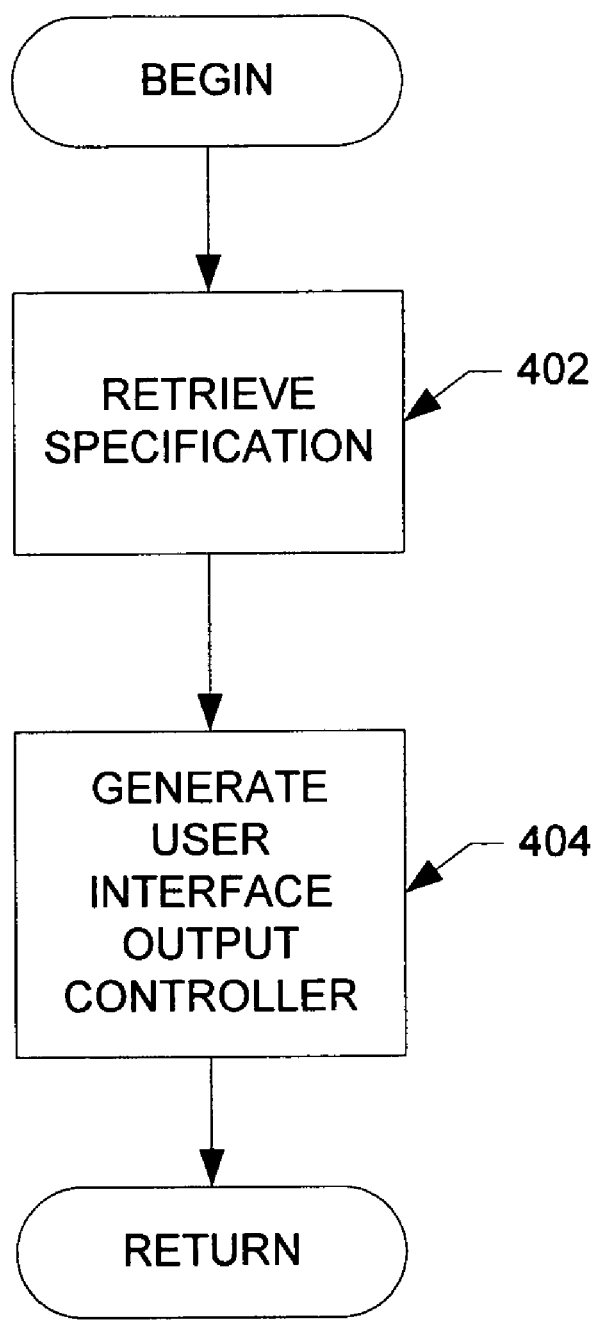
FIG. 4 is a flowchart illustrating the steps performed by the user interface output system in accordance with the preferred embodiment of the present invention.

A developer of a user interface output controller uses the specification language to write a specification. After a specification has been written, the user interface output system compiles the specification in order to generate a user interface output controller. FIG. 4 is a flowchart of the steps performed by the user interface output system to generate a user interface output controller. The user interface output system first retrieves the specification (step 402). Next, the user interface output system compiles the specification using a planning methodology, discussed in further detail below, to generate the user interface output controller (step 404).

As part of the compiling process, the user interface output system uses a planning methodology to perform a planning step. The planning methodology generates a plan from each possible start user interface output state to each possible goal user interface output state (i.e., which is specified with an event). A plan is a pair containing a start user interface output state along with the operators which transform the start user interface output state into a given goal user interface output state. In particular, the planning step provides the set of operators which modify a start user interface output state in response to an event. Then, when the application program provides the user interface output controller with an event, the user interface output controller retrieves the appropriate plan based on the goal user interface output state specified by the event and the current user interface output state (i.e., start user interface output state). The user interface output controller then performs the operators and displays the user interface output on the display device. In particular, the user interface output controller performs operators which transform the start user interface output state into the goal user interface output state in response to an event.

The goal user interface output states are specified by the :state and :op arguments of the event definitions provided by the specification. The operators are also defined by the specification. In addition, as discussed above, if an operator has been defined with a must-ask directive, then that operator may not be used in the planning step unless an event specifically requests that operator.

The planning methodology selects each goal user interface output state, and, for each goal user interface output state, the planning methodology performs the inverse of each operator on the goal user interface output state. If performing the inverse of an operator transforms the goal user interface output state to a new user interface output state, then the operator is stored along with the user interface output state. This new user interface output state is a possible start user interface output state for the goal user interface output state. Again, the inverse of each operator is performed on the new user interface output state to determine whether the operator would transform the new user interface output state to another user interface output state. This continues until the planning methodology finds all possible start user interface output states for that goal user interface output state along with the operators which would transform that start user interface output state into the goal user interface output state.

The following is pseudocode which implements the planning methodology.

Code Table 1

```
Procedure Main ( ):
    for each goal user interface output state, G, specified in an event definition do
        WorkingQ: = MakeEmptyQueue( )
        ResultQ: = MakeEmptyQueue( )
        Enqueue([G, NULL], ResultQ)
        Enqueue([G, NULL], WorkingQ)
        SubPlan(WorkingQ, G, ResultQ)
        RecordPlan(G, ResultQ)
    end for
end procedure
Procedure SubPlan(WorkingQ, SolvedStates, ResultQ):
    while (NotEmpty(WorkingQ)) do
        RootPlan: = Pop(WorkingQ)
        RootState: = First(RootPlan)
        RootOps: = Second(RootPlan)
        if(Length(RootOps) >= MAXDEPTH) exit loop
        for each state transforming operator O do
            if(not(RootState => not(Postconditions(O))) do
                NewState: = TransformState(RootState, O)
                if (not (NewState => SolvedStates)) do
                    NewOps: = Concatenate(O, RootOps)
                    Enqueue([Newstate, NewOps], ResultQ)
                    Enqueue([NewState, NewOps], WorkingQ)
                    SolvedStates: = SolvedStates OR NewState
                end if
            end if
        end for
    end while
end procedure
```

The Main procedure of Code Table 1 iterates over each of the goal user interface output states which are provided by the specification. Because different event definitions may have the same goal user interface output state, the planning methodology removes duplicate goal user interface output states. The Main procedure provides two queues, called ResultQ and WorkingQ. These queues both hold plans. A plan is a pair whose first element is a user interface output state, and whose second element is a sequence of operators that transform this user interface output state to the current goal user interface output state. ResultQ will hold all the plans (ordered from shortest to longest) found for a given goal user interface output state, and WorkingQ holds those plans that perhaps can still be expanded to form other plans. Both of these queues are initialized to contain the empty plan, representing the fact that when the start user interface output state is the goal user interface output state, no operators are performed.

The SubPlan procedure performs regression-based planning. For each goal user interface output state, the SubPlan procedure applies the inverse of each possible operator whose postcondition matches the condition of the goal user interface output state. The possible operators are provided by the specification. Operators which include a must-ask argument which is true are not considered unless the event specifies that the operator may be used. If performing the inverse of the operator changes the goal user interface output state, then SubPlan has found a new state. This is a potential start user interface output state. This start user interface output state is stored along with the operators needed to transform this start user interface output state to the current goal user interface output state in a plan in ResultQ. When the SubPlan procedure returns to the Main procedure, ResultQ contains plans that take any possible start user interface output state to the current goal user interface output state (except those whose operator sequences which are longer than a predefined number). The Main procedure records the plans for this particular goal, and then the Main procedure continues to solve for other goal user interface output states.

Figure 5A:
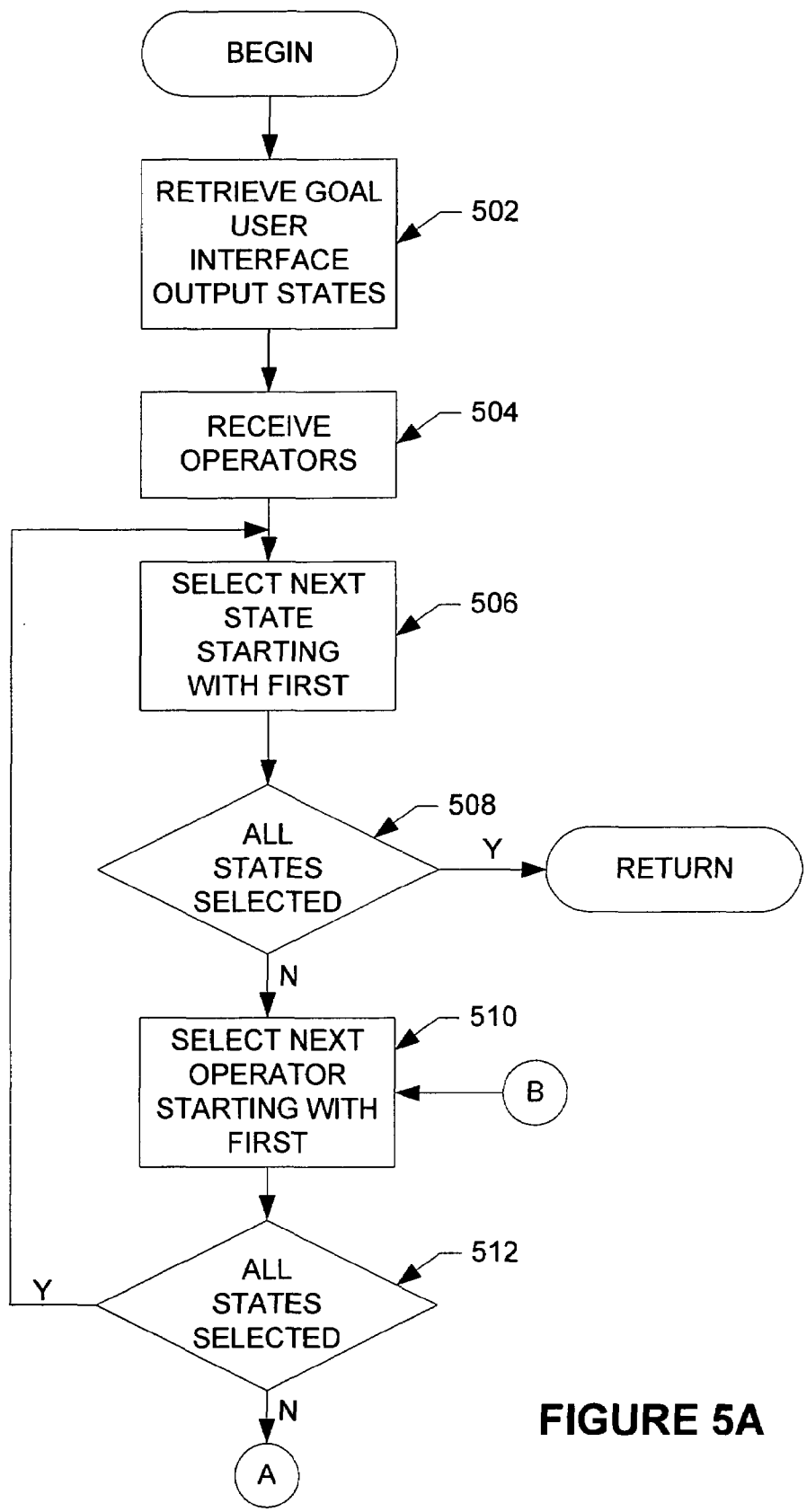
FIG. 5A and FIG. 5B are flowcharts illustrating the steps performed by the user interface output system using a planning methodology to determine a user interface output sequence from each start user interface output state to each goal user interface output state in accordance with the preferred embodiment of the present invention.
Figure 5B:
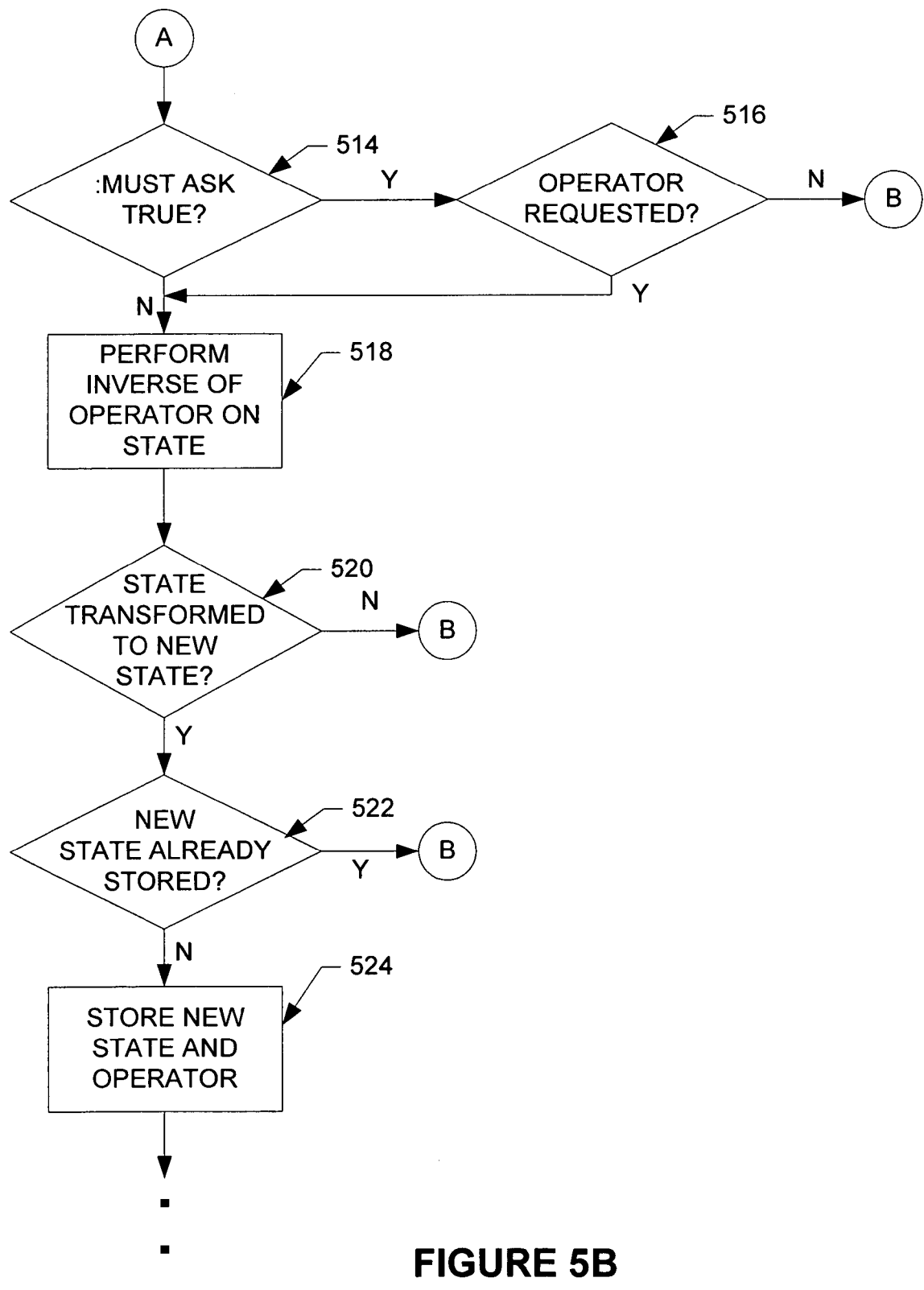

FIG. 5A and FIG. 5B are flowcharts of the steps performed by the user interface output system using a planning methodology to determine a user interface output sequence from each start user interface output state to each goal user interface output state. First, the user interface output system receives goal user interface output states (step 502). These are the states identified by the :state arguments and the preconditions of the :op arguments in the specification's event definitions. Then, the user interface output system receives the operators defined by the specification (step 504). Next, the user interface output system selects the next goal user interface output state starting with the first (step 506). The user interface output system determines whether all goal user interface output states have already been selected (step 508). If all of the goal user interface output states have already been selected, then the user interface output system returns, otherwise the user interface output system selects the next operator starting with the first (step 510).

Then, the user interface output system determines whether all operators have already been selected (step 512). If all operators have already been selected for the current goal user interface output state, then the user interface output system selects the next goal user interface output state (step 506). Otherwise the user interface output system determines whether the operator has a must-ask argument which is true (step 514). When an operator has a must-ask argument which is true, the planning step may not use this operator unless the goal user interface output state specifically requests it. The goal user interface output state may request the operator only if the goal user interface output state is associated with an :op statement of an event definition which specifies this operator. So, when the must-ask argument is true, the user interface output system determines whether the goal user interface output state requests the operator (step 516). If the goal user interface output state did not request the operator, then the user interface output system selects the next operator (step 510). If the goal user interface output state requests the operator or if the :must-ask argument is false, then the user interface output system performs the inverse of the operator on the goal user interface output state (step 518).

The user interface output system determines whether performing the inverse of the operator on the goal user interface output state transformed it to a new user interface output state (step 520). This new user interface output state is a user interface output state temporally prior to the goal user interface output state, and performing the operator on the new user interface output state would transform it to the goal user interface output state. If performing the inverse of the operator transformed the goal user interface output state into a new user interface output state, then the user interface output system determines whether the new user interface output state has already been stored for this goal user interface output state (step 522). If the new user interface output state has already been stored, the user interface output system selects the next operator (step 510). If the new user interface output state has not already been stored, the user interface output system stores this new user interface output state along with the operator that transforms this new user interface output state into the goal user interface output state (524). Then for this new user interface output state, the user interface output system determines each possible start user interface output state which may lead to the new user interface output state, along with the operator which transforms the possible start user interface output state to the new user interface output state, as indicated by the ellipses. This is also then done for each possible start user interface output state. The result is a series of user interface output states along with operators which transform each of the user interface output states into the goal user interface output state.

After performing the planning step, the user interface output system generates state-achieving procedures, which are procedures which convert an existing user interface output state to a goal user interface output state. The planning step computed plans (which associate a start user interface output state with an operator sequence to be performed) for each goal user interface output state. The user interface output system converts these plans to if-then-else blocks, which are encapsulated into procedures for their corresponding goals. These procedures return a value indicating whether or not the goal user interface output state can be achieved. These procedures are called state-achieving procedures.

Next, the user interface output system generates operator-execution procedures for every operator referenced in an event definition. For each of these operators, the user interface output system first calls a state-achieving procedure to attempt to establish any preconditions of the operator. If the preconditions are established, the operator-execution procedures perform the operator and adjust state variables to reflect the postcondition. When multiple operators share the same precondition, their operator-execution procedures may call the same state-achieving procedures.

Finally, the user interface output system generates event procedures for each event definition. The user interface output controller calls these procedures upon receiving an event from the application program. The event procedures invoke state-achieving procedures for each :state directive and operator-execution procedures for each :op directive in the event definition. In addition, the event procedures call code that manipulates a global variable for the :time directive. Also, the event procedures call code for the label directive to store the current value of this variable in an array, along with time values referencing this label.

Figure 6:
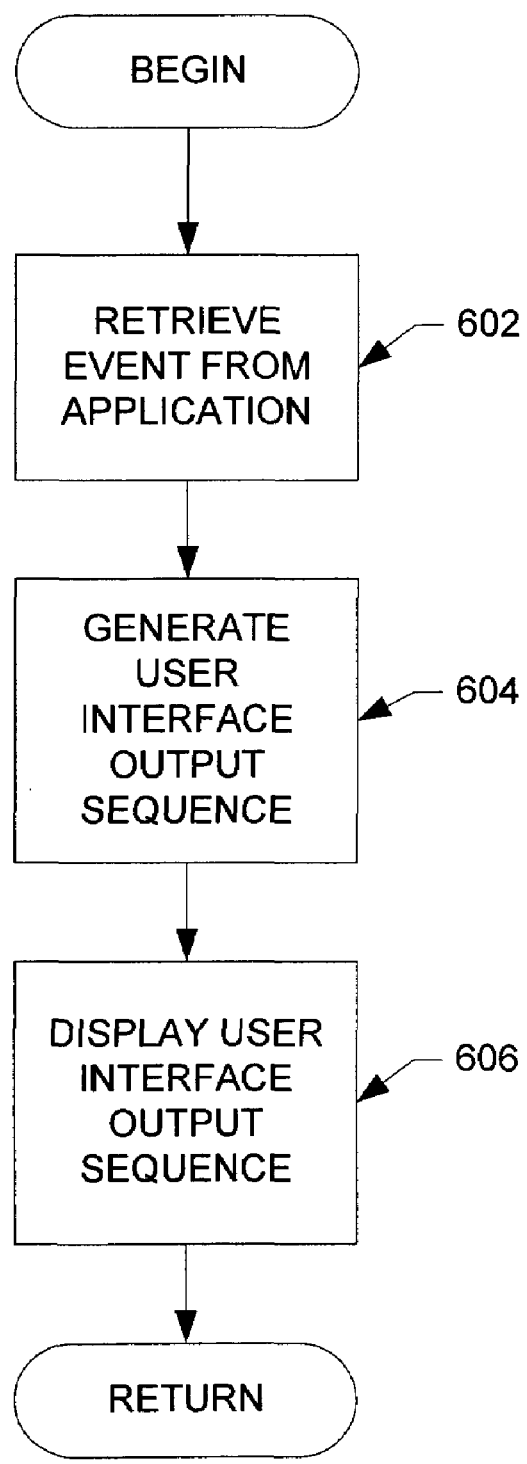
FIG. 6 is a flowchart illustrating the steps performed by the user interface output controller to process an event in accordance with the preferred embodiment of the present invention.

Once the user interface output controller is generated, the user interface output controller may process events. The steps performed by the user interface output controller to process an event are illustrated in FIG. 6. First, the user interface output controller receives an event from an application program (step 602). The event specifies at a high level a goal to be achieved by the user interface output. Then, the user interface output controller generates a user interface output sequence (step 604) which achieves the specified goal. In a preferred embodiment of the present invention, the user interface output controller displays the user interface output sequence on a display device (step 606).

Figure 7:
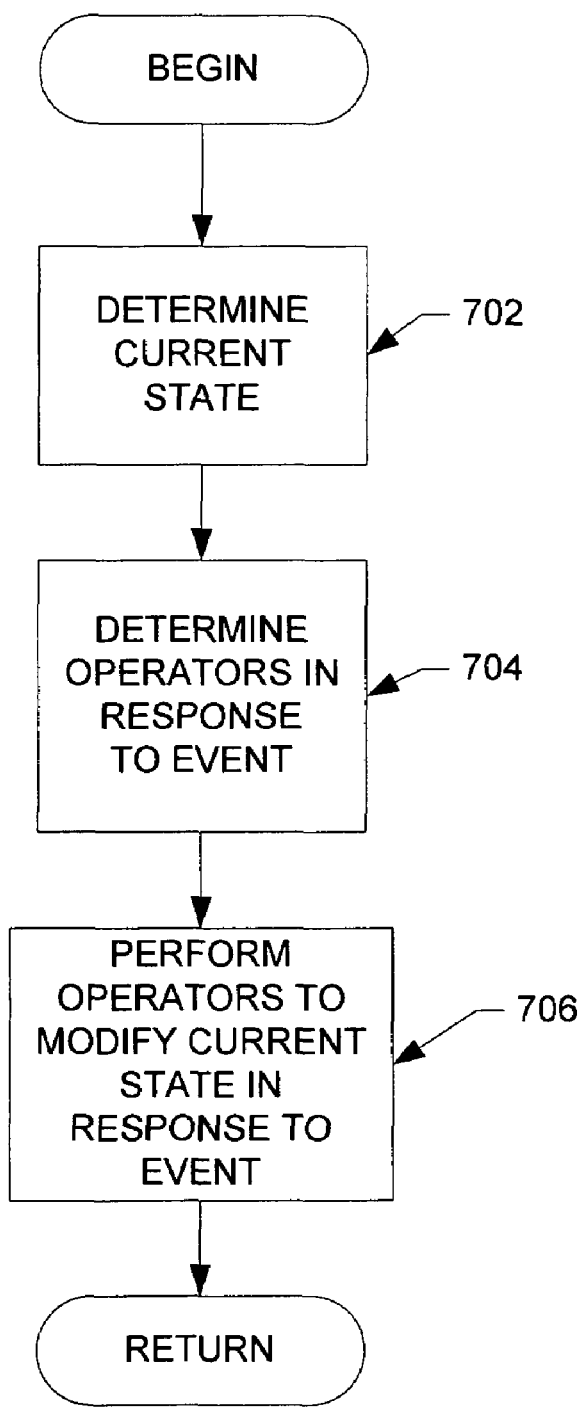
FIG. 7 is a flowchart illustrating the steps performed by the user interface output controller to generate a user interface output sequence.

In particular, the steps performed by the user interface output controller to generate a user interface output sequence are shown in FIG. 7. First, the user interface output controller determines the current user interface output state (step 702) which indicates the conditions of the user interface output as it is currently. Next, the user interface output controller determines the operators which should be performed in response to the event (step 704). Then, the user interface output controller performs the operators to modify the current user interface output state, in response to the event (step 706).

Although the present invention has been described in terms of the preferred embodiment, it is not intended that the invention be limited to this embodiment. Modification within the spirit of the intention will be apparent to those skilled in the art. The scope of the present invention is defined by the claims which follow. In particular, although the present invention has been discussed with examples including animation and audio elements, user interface output may include other forms of media such as video and textual elements. Moreover, although the present invention has been described with the user interface output controller as part of the user interface output system, it may be a separate component which is connected to the user interface output system.

The invention claimed is:

1. In a data processing system including a display device and a processing means running an application program, the application program having a user interface with a plurality of User Interface Output States (UIOSes) and a plurality of operators, each operator for transforming a currently displayed UIOS to a displayed next UIOS, a method comprising the steps of:
   providing a user interface output system for controlling the generation of a user interface output sequence;
   providing a specification identifying a plurality of goal UIOSes for the user interface output system to establish and identifying the plurality of operators, each of the operators having at least one precondition to be satisfied before the operator can be performed;
   providing a compiler for compiling the specification which results in a user interface output controller distinct from the application program, the user interface output controller including a plurality of plans, each of the plans having a series of operators, a start UIOS and one of the goal UIOS es, the series of operators for transforming the start UIOS to at least one intermediate UIOS to the goal UIOS, the operators in the series such that the preconditions of each of the other operators in the series are satisfied after performance of earlier operators in the series; and
   while the application program is running on the processing means,
      providing the user interface output controller with an event received from the application program, the event identifying one of the goal UIOSes;
      determining a currently displayed UIOS;
      retrieving one of the plurality of plans such that the start UIOS of the retrieved plan is the currently displayed UIOS and the goal UIOS of the retrieved plan is the goal UIOS identified by the event; and
      performing the series of operators provided by the retrieved plan to display the start UIOS followed by the at least one intermediate UIOS followed by the goal UIOS.

2. The method of claim 1 wherein the step of providing a specification includes the steps of:
   providing events which may be specified by the application program and for which the user interface output system provides user interface output sequences;
   providing state variables that define attributes of each user interface output state; and
   providing operators that identify actions which are used to modify the attributes of each user interface output state.

3. The method of claim 2 wherein the specification includes timing directives which determine the time at which an action is performed.

4. The method of claim 2 further comprising providing state class definitions which are hierarchical groupings of state variables.

5. The method of claim 2 further comprising providing autonomous action sequences identifying actions which are performed by the user interface output system when a current user interface output state contains predefined values for conditions which capture attributes of the current user interface output state.

6. The method of claim 1 wherein the step of compiling the specification applies a planning methodology to generate each of the plans.

7. The method of claim 6 wherein the step of applying a planning methodology to generate each of the plans includes the steps of
   selecting each of the plurality of goal UIOSes,
   for each selected goal UIOS, selecting each of the plurality of operators:
   performing an inverse of the selected operator on the selected goal UIOS; and
   when the operators transforms the selected goal UIOS into a new UIOS, storing the new UIOS along with the selected operator.

8. The method of claim 7 wherein the new UIOS is identified as an intermediate UIOS and is then processed as a goal UIOS.

9. In a data processing system including a display device and a processing means running an application program, a method comprising the steps of:
   providing a compiled user interface output controller for generating a user interface output sequence, the user interface output controller distinct from the application program, the user interface output sequence including a first user interface output state (UIOS) and a second user interface output state, the first user interface output state and the second user interface output state each including a set of conditions representing values which capture attributes of that user interface output state; and
   under the control of the user interface output controller, receiving operators from the application program each operator having a precondition consisting of one of the conditions in the set and a required value for the condition such that the operator can only be performed when a current user interface output state satisfies the precondition by including the condition representing the required value;
   after receiving the operators, receiving an event from the application program specifying a goal to be achieved by the user interface output sequence;
   upon receiving the event from the application program, determining conditions which temporally precede the event;
   establishing the determined conditions which precede the event;
   performing a plurality of the received operators to transform the first user interface output state into the second user interface output state, which establishes the event, the plurality such that a first operator of the plurality has a precondition which is satisfied by a current user interface output state and wherein after the performance of each operator in the plurality resulting UIOS satisfies the precondition for the operator next in the plurality;

determining conditions which temporally follow the event, and establishing the determined conditions which follow the event.

10. A data processing system, comprising:
a display device for displaying a sequence of a plurality of user interface output states (UIOSes);
a processing means for running an application program;
means for providing a user interface output system for controlling the generation of the sequence;
means for providing a specification identifying goal UIOSes for the user interface output system to establish and identifying a plurality of operators, each operator for transforming one UIOS into another UIOS such that a precondition of the operator is established by the one UIOS and such that a postcondition of the operator is established in another UIOS:
means for compiling the specification to generate a user interface output controller distinct from the application program; and
means for storing the user interface output controller in memory, the user interface output controller including, means for receiving an event from the application program, the event identifying one of the goal UIOSes
means for determining a current UIOS in the sequence;
means for determining a series of operators which transform the determined current UIOS into the identified one of the goal UIOS and
means for performing the series of operators to display the sequence on the display device, the performing to transform the determined current UIOS into at least one intermediate UIOS and then into the identified one of the goal UIOSes.

11. The system of claim 10 wherein the received event identifies a timing specification which determines the time at which the series of operators are performed.

12. The system of claim 11 further comprising means for incorporating the identified timing specification into the sequence.

13. A user interface output system for controlling the generation of a user interface output sequence, comprising:
a specification for identifying goal user interface output states, which identify user interface output states for the user interface output system to establish and for identifying operators which specify actions to be performed by the user interface output sequence each of the operators having at least one precondition to be satisfied before the operator can be executed;
a compiler for compiling the specification to generate a user interface output controller distinct from an application program; and
a storage for storing the user interface output controller in memory, the user interface output controller comprising,
a receiver for receiving an event from the application program, the event identifying one of the goal user interface output states;
a first determinor for determining a current user interface output state in the user interface output sequence;
a second determinor for determining a sequence of operators which transform the determined current user interface output state into at least one intermediate user interface output state and then into the identified one of the goal user interface output states, the operators in the sequence such that after execution of each of the operators in the sequence other than a last operator, the preconditions of a next operator in the sequence are satisfied; and
an executor for executing the sequence of operators to transform the determined current user interface output state into the at least one intermediate user interface output state and then into the identified one of the goal user interface output states so as to display the sequence of operators on a display device.

14. The system of claim 13 wherein the received event identifies a timing specification which determines the time at which the sequence of operators are performed.

15. The system of claim 14 further comprising a timer for determining the time at which the sequence of operators are performed.

16. A computer-readable storage medium, upon which is stored a compiled user interface output controller for generating a user interface output sequence, the user interface output controller distinct from an application program and performing the steps of:
receiving an event from the application program, the event specifying a goal to be achieved by the user interface output sequence by displaying a series of a plurality of user interface output states; and
upon receiving the event from the application program, generating the user interface output sequence for achieving the goal user interface output sequence including: a plurality of operators that if executed when a predefined set of conditions are true will display the plurality of user interface output states, the predefined set of conditions including at least one precondition of a first of the plurality of operators such that at least one precondition must be true before the first operator can be executed, the operators in the sequence ordered such that execution of previous operators in the sequence will establish as true conditions necessary for execution of a next operator in the sequence; and
executing the plurality of operators of the generated user interface output sequence when the predefined set of conditions is true so as to display the series of the plurality of user interface output states on a display device.

17. In a data processing system including a display device and a processing means running an application program, the application program having a user interface with a current User Interface Output State (UIOS) displayed on the display device, a method comprising:
providing a compiled user interface output controller for displaying the user interface, the user interface output controller distinct from the application program;
under control of the application program,
without knowledge of the current UIOS displayed on the display device, determining a goal UIOS to be displayed on the display device; and
sending to the user interface output controller an indication of the goal UIOS; and
under control of the user interface output controller,
receiving from the application program the indication of the goal UIOS;
determining the current UIOS;
determining a sequence of a plurality of operators based on the determined current UIOS and the goal UIOS; and
for each of the operators in sequence, performing the operator to transition the user interface from the current UIOS to a different resulting UIOS, the performing such that the resulting UIOS is displayed on the display device and becomes the current UIOS and such that the current UIOS after all the operators are performed is the goal UIOS, the sequence such that the preconditions for a first operator in the sequence are currently established and such that the preconditions for all other operators in the sequence are established after execution of earlier operators in the sequence, whereby the application program specifies the goal UIOS without knowledge of the current UIOS, and in response the user interface output controller determines a sequence of operators that when performed transition the user interface from the current UIOS through at least one displayed intermediate UIOS to the displayed goal UIOS.

18. The method of claim 17 wherein the determined sequence of the plurality of operators is generated after the receiving of the indication of the goal UIOS.

19. The method of claim 17 wherein each UIOS has a value for each of a plurality of UIOS variables, wherein each operator has a precondition of a UIOS variable and a required value for the UIOS variable, wherein an operator having a precondition of a first variable and a first value can only be performed when the current UIOS satisfies the operator precondition by having a value for the first variable that is equal to the first value, wherein the determined sequence begins with a first operator whose precondition is satisfied by the determined current UIOS, and wherein alter the performance of each operator in the determined sequence, the resulting UIOS satisfies the precondition for the operator next in the determined sequence.

20. The method of claim 19 wherein the determined sequence is generated by:
   identifying the UIOS variable whose value in the goal UIOS is different than in the current UIOS;
   selecting a last operator such that the resulting UIOS from performing the last operator has a value for the identified UIOS variable that is equal to the value for the identified UIOS variable in the goal UIOS;
   selecting an initial operator such that the resulting UIOS from performing the initial operator satisfies the precondition of the last operator;
   until the current UIOS satisfies the precondition of the initial operator, repeatedly performing the steps of
   designating the initial operator to be an intermediary operator; and
   selecting an initial operator such that the resulting UIOS from performing the initial operator satisfies the precondition of the operator most recently designated to be the intermediary operator,
   determining the plurality of operators to be the selected operators; and
   determining the sequence of the plurality of operators to be a reverse of the selection order.

21. A method for displaying user interface information for a plurality of application programs, each application program having a distinct user interface and an operator set consisting of a plurality of operators, each operator having at least one precondition which must be established before the operator can be performed, the method comprising:
   providing a compiled user interface output controller distinct from the application programs; and
   under control of the user interface output controller and for each of the application programs,
   receiving from the application program the operator set for the application program; after receiving the operator set, receiving from the application program a plurality of user interface goals, each user interface goal reflecting information to be displayed in the user interface for the application program; and
   for each user interface goal, achieving the user interface goal by determining the information currently displayed in the user interface for the application program;
   after receiving the user interface goal, determining a series of operators from the operator set for the application program that will transition the user interface for the application program from displaying the determined information to displaying the information reflected by the user interface goal, the series such that the preconditions for a fast operator in the series are currently established and such that the preconditions for all other operators in the series are established after execution of earlier operators in the series; and
   executing the determined series of operators in sequence such that the information reflected by the user interface goal is displayed when the executing is complete, whereby an executing user interface output controller can receive a set of operators and a plurality of user interface goals from each of the plurality of application programs, and can determine for each user interface goal the series of operators from the operator set for the application program that when executed in sequence will achieve the user interface goal.

* * * * *

UNITED STATES PATENT AND TRADEMARK OFFICE
CERTIFICATE OF CORRECTION

PATENT NO. : 7,012,607 B1
APPLICATION NO. : 09/437560
DATED : March 14, 2006
INVENTOR(S) : David J. Kurlander et al.

It is certified that error appears in the above-identified patent and that said Letters Patent is hereby corrected as shown below:

On the title page, item (56), under "Other Publications", in column 2, line 3, after "39-40" insert -- and 41-42 --.

On the title page, item (56), under "Other Publications", in column 2, line 4, after "et al." insert -- , --.

On the title page, item (57), in "Abstract", in column 2, line 4, after "application" delete "pro" and insert -- program --, therefor.

In column 1, line 33, delete "wines" and insert -- wings --, therefor.

In column 2, line(s) 37-38, delete "low level" and insert -- low-level --, therefor.

In column 2, line 41, delete "low level" and insert -- low-level --, therefor.

In column 2, line 43, delete "low level" and insert -- low-level --, therefor.

In column 8, line 23, delete "must-ask" and insert -- :must-ask --, therefor.

In column 10, line 42, delete "label" and insert -- :label --, therefor.

In column 10, line 48, delete "label" and insert -- :label --, therefor.

In column 10, line 52, delete "label" and insert -- :label --, therefor.

In column 11, line 50, delete "must-ask" and insert -- :must-ask --, therefor.

In column 12, line 23, delete "if(Length(RootOps)" and insert -- if (Length(RootOps) --, therefor.

In column 12, line 25, delete "if(not(RootState" and insert -- if (not(RootState --, therefor.

In column 12, line 25, after "(not(RootState" insert -- ) --.

In column 12, line 59, delete "must-ask" and insert -- :must-ask --, therefor.

UNITED STATES PATENT AND TRADEMARK OFFICE
CERTIFICATE OF CORRECTION

PATENT NO. : 7,012,607 B1
APPLICATION NO. : 09/437560
DATED : March 14, 2006
INVENTOR(S) : David J. Kurlander et al.

It is certified that error appears in the above-identified patent and that said Letters Patent is hereby corrected as shown below:

In column 13, line 34, delete "must-ask" and insert -- :must-ask --, therefor.

In column 13, line 35, delete "must-ask" and insert -- :must-ask --, therefor.

In column 13, line 41, delete "must-ask" and insert -- :must-ask --, therefor.

In column 14, line 45, delete "label" and insert -- :label --, therefor.

In column 14, line 53, delete "high level" and insert -- high-level --, therefor.

In column 15, line 39, in Claim 1, delete "UIOS es" and insert -- UIOSes --, therefor.

In column 16, line 19, in Claim 7, after "of" insert -- : --.

In column 16, line 20, in Claim 7, after "UIOSes" delete "," and insert -- ; --, therefor.

In column 19, line 49, in Claim 20, after "operator" delete "," and insert -- ; --, therefor.

Signed and Sealed this

Eighteenth Day of August, 2009

David J. Kappos
*Director of the United States Patent and Trademark Office*